United States Patent [19]

Donahue

[11] Patent Number: 5,014,222
[45] Date of Patent: May 7, 1991

[54] METHOD OF MANIPULATING IMAGES LARGER THAN A VIEWPORT

[75] Inventor: Thomas J. Donahue, Hudson, Mass.

[73] Assignee: Bull HN Information Systems Inc., Billerica, Mass.

[21] Appl. No.: 374,520

[22] Filed: Jun. 30, 1989

[51] Int. Cl.⁵ .............................................. G06K 15/00
[52] U.S. Cl. ..................................... 364/521; 340/724
[58] Field of Search ........................ 364/518, 521, 522; 340/721, 724, 725, 726, 727, 730, 731, 723; 382/45, 47, 48, 44

[56] References Cited

U.S. PATENT DOCUMENTS 4,197,590  4/1980  Sukonich ............................. 340/721

Primary Examiner—Arthur G. Evans
Attorney, Agent, or Firm—Gerald J. Cechony; John S. Solakian

[57] ABSTRACT

In a distributed data processing system having a plurality of terminals or workstations, and providing the ability for users at terminals to access complex graphic images from a mainframe host and manipulate them at their terminals for inclusion into their own works, a method is provided for manipulating elements of an image too complex or detailed to be displayed in their entirety on a terminal. Demarkation may be performed at one portion of the image, and may be completed in another portion of the image in which the first portion is off screen.

2 Claims, 4 Drawing Sheets

METHOD OF MANIPULATING IMAGES LARGER THAN A VIEWPORT

FIELD OF THE INVENTION

This invention relates to digital data systems adapted for viewing and manipulating graphic images on a cathode ray tube screen, particularly to systems in which the screen presents a viewport through which all or a portion of the graphic image may be viewed, and most particularly to methods of performing operations on graphic images only portions of which are visible through the viewport.

BACKGROUND OF THE INVENTION

Digital computer systems have in recent years come into widespread use for the generation and manipulation of many kinds of information, including graphic (pictorial) information. For such an application, the system is usually provided with a cathode ray tube (CRT) display, since such a display permits rapid "painting", enabling complex information to be displayed quickly, and enabling the effects of new commands to be seen within a short time.

Graphic information to be stored in a digital computer system for presentation on a CRT display has generally been stored in two ways, known as "object-based" and "pixel-based":

In an object-base storage scheme, information determinative of the graphic information to be displayed, rather than a direct representation of that information, is stored; for example, the coordinates of the beginning and ending points of a line, the coordinates of the corners of a rectangle, the radius and the coordinates of the center of a circle, etc. This method has the disadvantage that computation of the screen contents must be performed on the definitional information.

In a pixel based storage scheme, for each elemental portion of the CRT screen (denoted a "pixel", that term being derived from picture element), memory is organized with a storage cell corresponding to each pixel position on the screen, and information is stored in each cell connoting what is to be displayed at the corresponding pixel position. In the simplest implementation, a single bit is stored in a cell denoting whether the corresponding screen pixel position is ON or OFF; in more complex implementations, a multi-bit binary number is stored that might denote such quantities as the color, intensity, and attributes (blinking, reverse video, etc.) of a corresponding screen pixel position. This method has the disadvantage that "zooming" (changing the displayed size of the elements) requires extensive manipulation of the stored data.

User applications often wish to work with graphic images of such size and complexity that it may not be expedient to display the entire image on the screen at one time. Doing so might require individual elements to be represented smaller on the screen then the screen granularity can accurately render or the human eye can distinguish. In a situation where a user is working on a workstation that may function as a terminal of a mainframe host system, he may have accessed a graphic image from the host system and may wish to manipulate it or alter it for inclusion in a document of his own; he thus could be attempting to work with a larger, more complex image than he could feasibly have created at the workstation.

Furthermore, in some implementations of pixel-based graphics systems, "zooming out" to view the entire image at once is accomplished by manipulating the bit map in such a way that bits are discarded in order to effectively "shrink" the element sizes; while subsequent "zooming in" can restore the image to the size it had before zooming out, resolution will have been irreparably degraded.

It thus behooves a user running under such an implementation to remain "zoomed in", viewing only a portion of his total image at any one time on the screen. A capability to "pan" is usually provided, enabling the user to select any portion of the overall image as the portion that is currently visible to him on the screen.

A complication can occur when a user desires to perform a manipulation (e.g., moving, rotating, changing the fill pattern, altering text size or font, etc.) on an element or an area larger than is visible on the screen at one time. The prior-art methods for identifying such an element or area consist in using a pointing device (e.g., a "mouse") to identify two diagonally opposite corners of a rectangle containing the element or area to be identified. It is, of course, impossible to do this when the entire perimeter of the desired rectangle cannot be seen at once; under the prior-art methods, the user would be required to zoom out in order to specify the rectangle, encountering the aformentioned loss of granularity.

SUMMARY OF THE INVENTION

The present invention overcomes these drawbacks of the prior art by providing a method wherein the diagonally opposite corners of the rectangle required for demarking an element or area to be manipulated may be identified in separate steps, on portions of the image that need not be simultaneously visible on the screen. The user may pan to a portion of the graphic image where he wishes to place one corner of the rectangle, and may identify the position of that corner with his pointing device. He may then pan to a different portion where he desires to place the the diagonally opposite corner, and identify that corner with his pointing device. The location of the first corner is "remembered", and the rectangle is drawn; that portion of the rectangle which lies within the currently visible portion of the image is visible to the user. Should the user pan to other portions of the image, portions of the rectangle that lie therein will then be visible. The user may thus verify that the rectangle demarks the area he intended, and may then proceed to operate on elements within the rectangle.

It is thus an object of the present invention to provide improved capability to manipulate complex graphic images from a terminal or workstation.

Other objects and advantages of the present invention will be apparent to those skilled in the art after reviewing the following Description of the Preferred Embodiment, and the appended drawings.

DESCRIPTION OF THE PREFERRED EMBODIMENT

Figure 1:
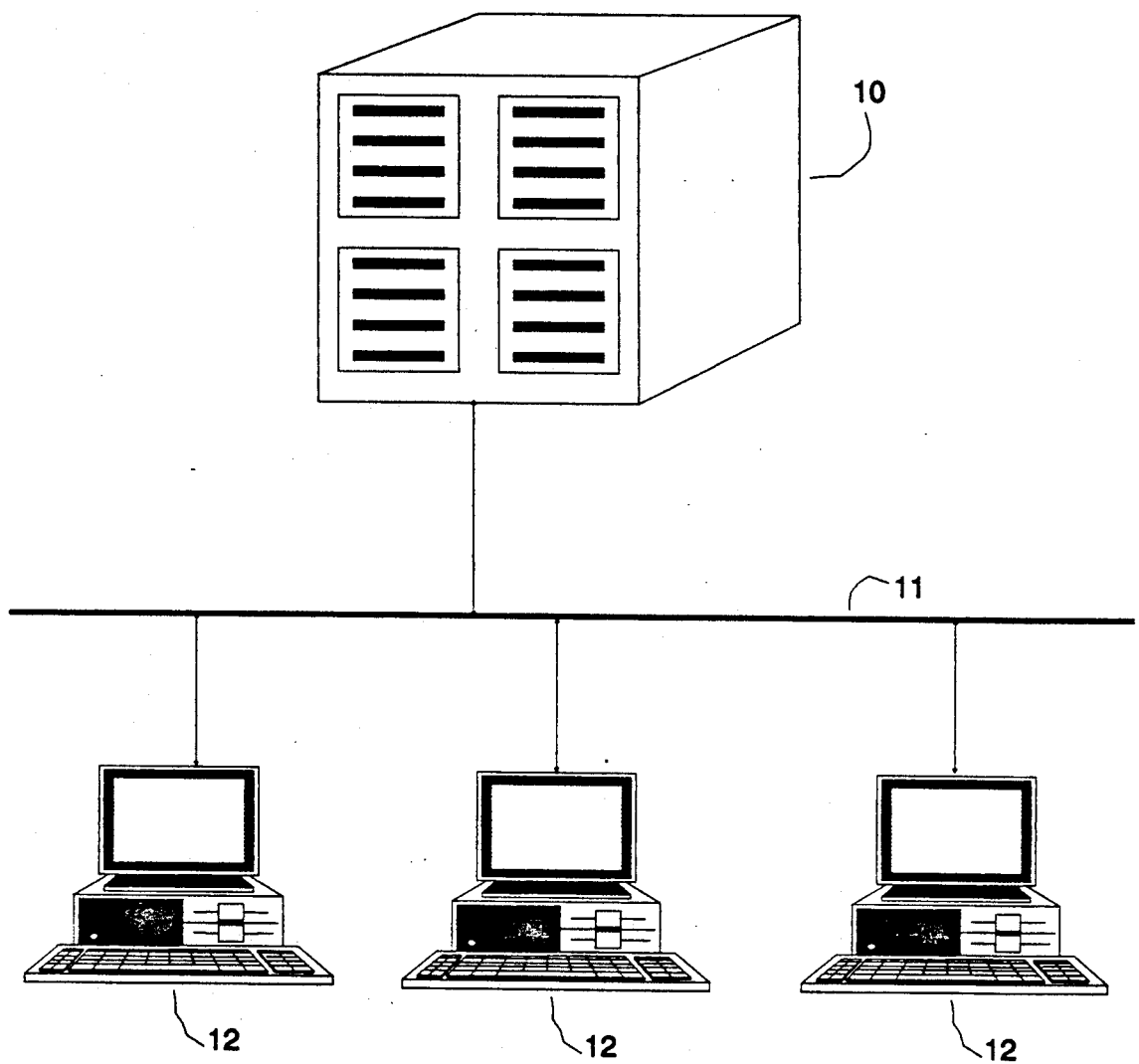
FIG. 1 depicts a typical distributed computer system on which the invention might be practiced, comprising a plurality of workstations connected by means of a bus to a mainframe host computer.

The invention would typically be practiced in a distributed data processing system such as that shown in FIG. 1, comprising a mainframe host computer to which are connected, by means of a bus or communications medium 11, a plurality of terminals or workstations 12.

Users at the work stations might locally run freestanding applications on data files stored locally at the workstation, might put the workstation into terminal emulation mode and remotely run applications on the host computer, or might download programs or data from the host computer to be run or operated upon at the workstation in free-standing mode.

The present invention is useful when pixel-based graphic data is downloaded to a workstation for manipulation there. The display screen typically provided at a workstation does not have sufficient size or resolution to display a large or complex graphic image in its entirety with good legibility. A user might download a graphic image from the host for inclusion in one of his own works which might be of such size or complexity.

He might wish to modify the graphic image (remove or add elements, change fill patern or line weight, change text typeface or size, move or rotate elements, change the size of elements, etc.). Were he to try to view the entire graphic image at once on his screen, it might appear so crowded that individuals elements are not legible, or may not be identified by his pointing device with sufficient particularity. Also, in a pixel-based implementation, "zooming out" to render the entire image visible simultaneously is accomplished by manipulating the pixel map in such a manner that bits are discarded; as a result, the image will have coarser granularity.

Figure 2:
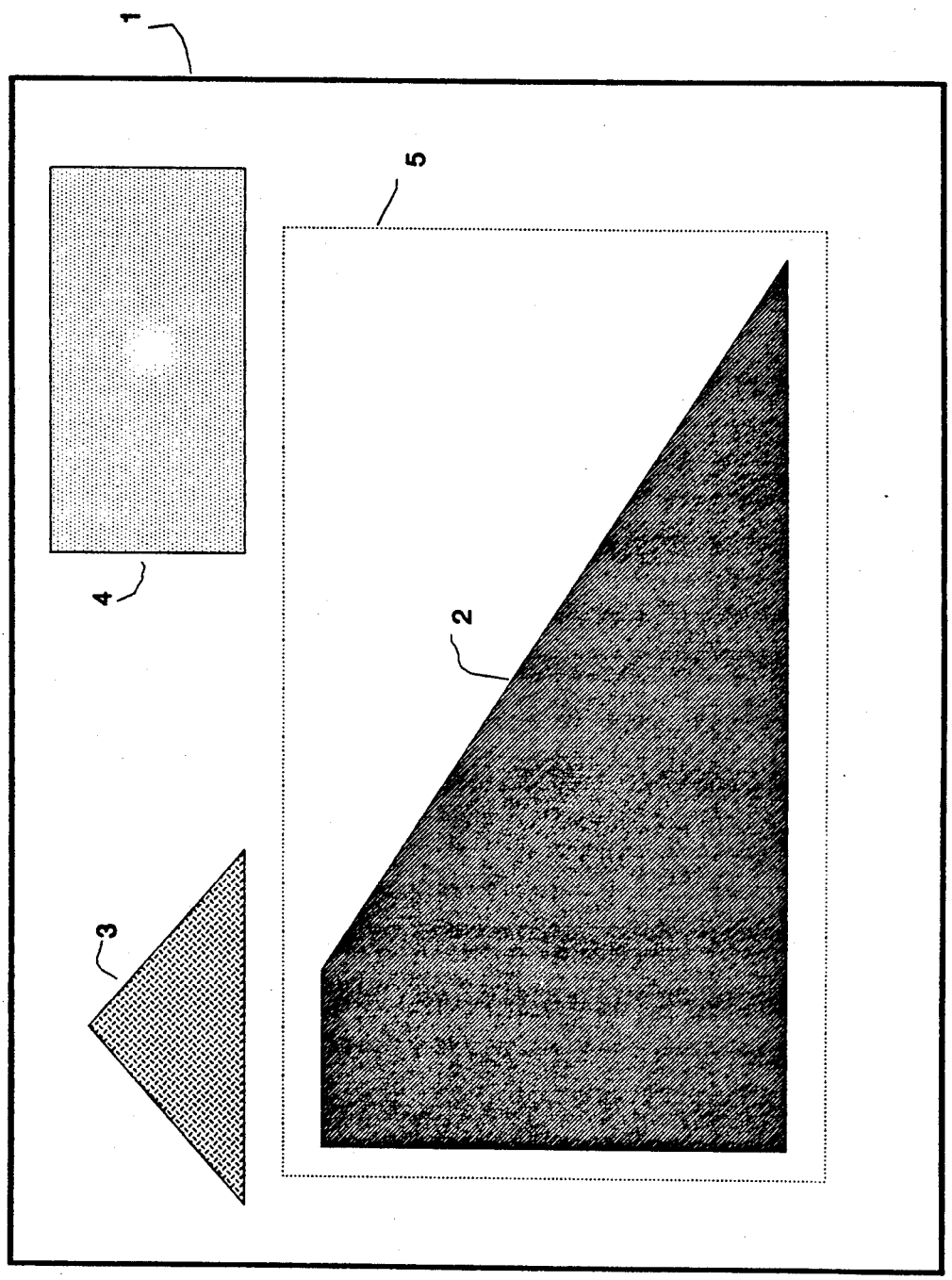
FIG. 2 depicts a hypothetical graphics image accessible from a host computer which a user at a terminal or workstation might wish to manipulate.

FIG. 2 depicts a hypothetical graphic image 1, containing elements 2, 3, and 4. Graphic image 1 is a simple one, for illustrative purposes; typical graphic images would contain many more elements, in much closer and more complex juxtaposition.

It is supposed for illustrative purposes that the user desires to perform some manipulation on element 2. The conventional means for identifying element 2 as the element to be manipulated is to draw rectangle ("box") 5 around it, by indicating with a pointing device (e.g., "mouse") the positions of two diagonally opposite corners of it.

However, it must be borne in mind that, as noted above, it is not feasible to view the entire graphic image 1 at one time. Thus, it probably will not be possible to simultaneously view the desired locations of the two diagonally opposite corners in order to demark them. The prior-art methodology would require zooming out, with its concomitant loss of granularity, to accomplish the demarkation. The method of the present invention, permits demarkation of the rectangle without zooming in.

Figure 3:
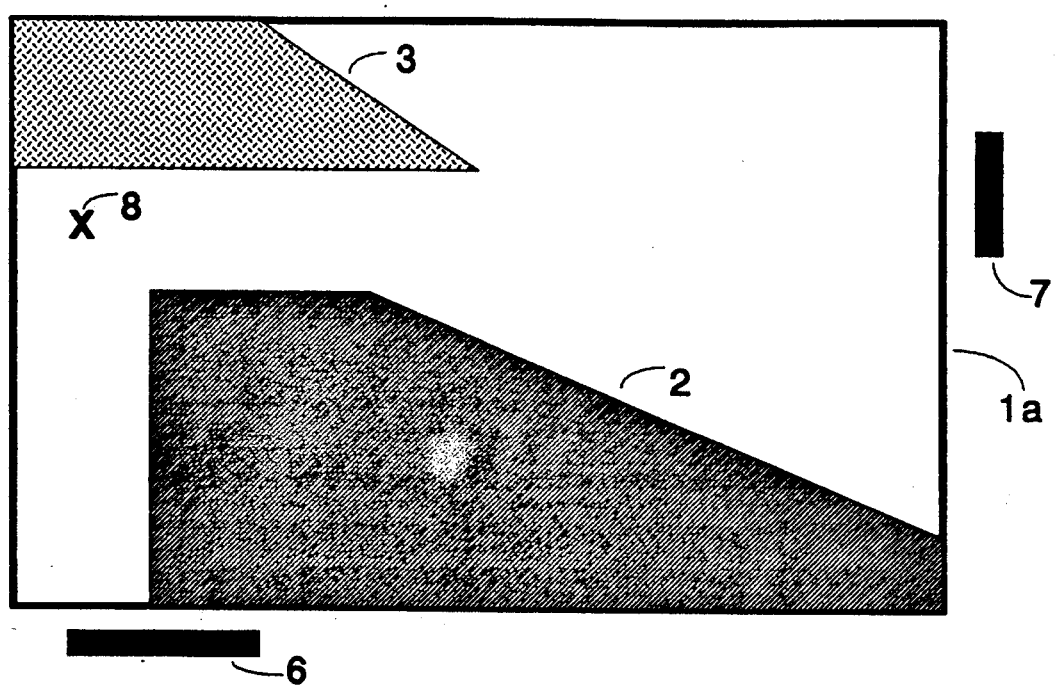
FIG. 3 depicts a portion of the graphics image, such portion being feasible for viewing at the user's terminal or workstation, and illustrates a step in demarking an area or element to be manipulated.

FIG. 3 depicts a typical screen display on which appears a portion 1a of graphic image 1. For apprising the user of which portion of the total graphic image he is currently viewing, the prior art typically employs "scroll bars" 6 and 7, which indicate a vertical and horizontal strip, respectively, of the overall graphic image, the currently visible portion occupying the area the two strips have in common. Panning to a different area may be accomplished by "dragging"' the scroll bars with a mouse, well known in the prior art, or alternatively by typed commands or by the use of the arrow keys with which most terminals are provided. FIG. 3 is seen to contain the portion of graphic image 1 in which is one of the corners of the desired rectangle 5 (shown in FIG. 2), and there is a sufficient amount of detail visible to enable a user to place the corner where he wishes it.

Under the present invention, the user can demark with his mouse the position where he wishes to place the corner, and that position will be remembered for him. This position is denoted in FIG. 3 by the "X", element number 8.

Figure 4:
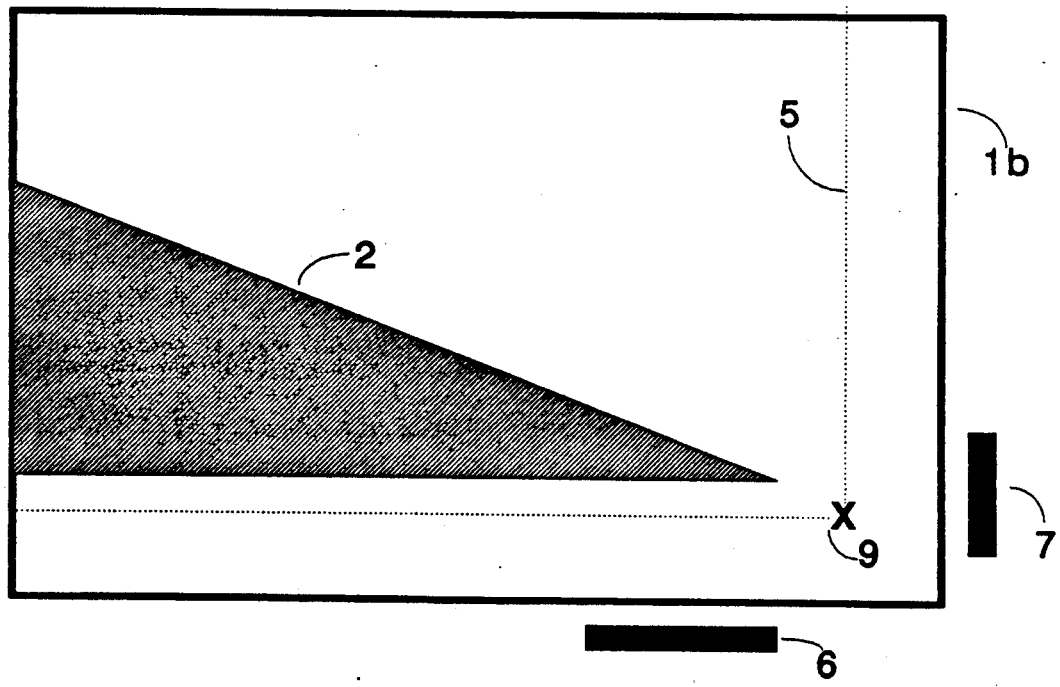
FIG. 4 depicts a different portion of the graphics image, and illustrates a different step in demarking an area or element to be manipulated.

He can then pan (by means described above) to the portion of the graphic image 1 in which he desires to place the diagonally opposite corner of rectangle 5; such portion is shown as portion 1b in FIG. 4. Note that in FIG. 4, scroll bars 6 and 7 have moved to the positions corresponding to the portion of graphic image 1 which is now visible. Again, the user sees the image with sufficient detail that he may place a corner of rectangle 5 where he wishes it; that corner is denoted in FIG. 4 by the "X", element 9. Upon his placing it, the desired rectangle 5 is finalized by the program as shown in FIG. 4. The rectangle being larger than the portion visible on the screen at one time, it is not all visible in FIG. 4.

All elements within rectangle 5 are now said to be "selected". Any manipulations specified by the user will be performed on all the elements within the rectangle (in the present example, the polygon 2). Manipulations that may be performed are as in the prior art, and will not be discussed here.

Figure 6:
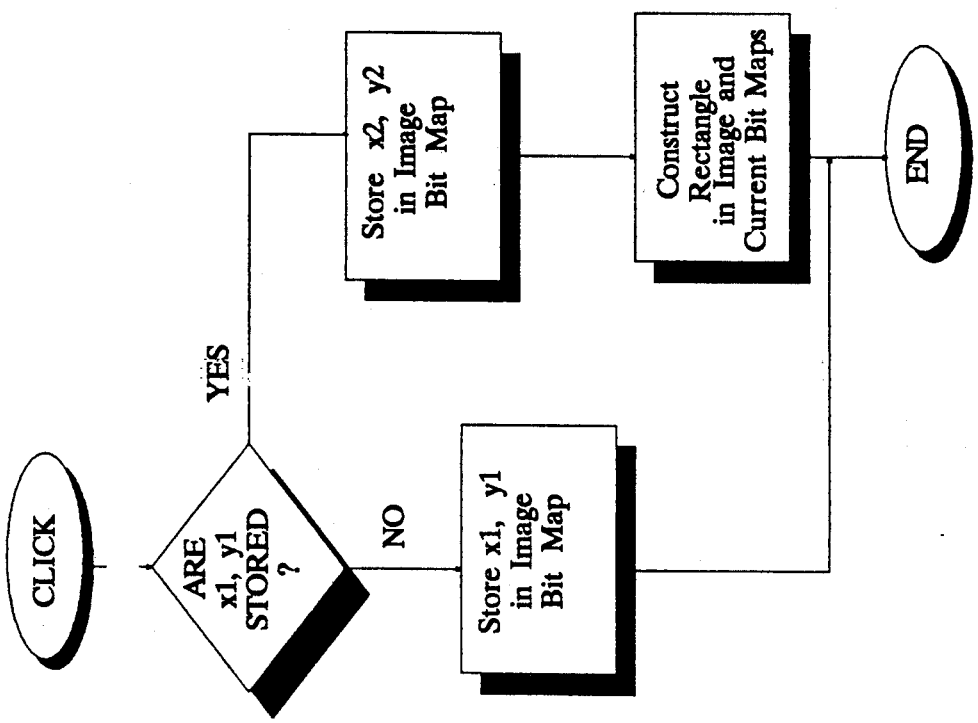
FIG. 6 is a flow chart of the method of the present invention of demarking elements within a graphic image.
Figure 5:
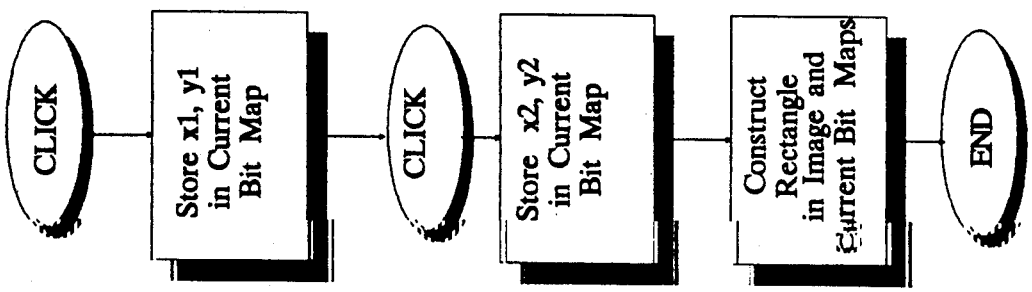
FIG. 5 is a flow chart of the prior-art method of demarking elements within a graphic image.

FIGS. 5 and 6 are simplified flow charts of the prior-art method of defining the rectangle 5 and the method of the present invention, respectively.

Referring to FIG. 5, a mouse click selecting a point for one corner of a rectangle will provide (by means well known to those skilled in the art) the screen coordinates of the point, denoted x1, y1. These will be stored relative to the current bit map-- that is, the bit map for the currently-displayed portion. In order for that action to have any efficacy, the next action from the user must be to provide a second mouse click, denoting the point for the diagonally opposite corner of the rectangle. That point's coordinates, denoted x2, y2 are provided by the mouse. They too are stored relative to the current bit map, and the rectangle thus defined may then be constructed.

FIG. 6 (describing the present invention) is seen to contrast with the prior art in that it describes a routine that must be entered separately for each of the two mouse clicks, and which stores the first coordinate pair relative to the bit map of the entire image; it thus permits the user to pan to a different portion of graphic image 1 in between the two clicks, and permits him to demark the two corners in portions of the graphic image 1 that need not be simultaneously visible to him.

Upon each click, a check is made to see whether a coordinate pair is already stored. Upon the first of the two clicks, this test would fail, leaving the decision box on the "NO" path; the x1, y1 values are stored relative to the bit map of the entire image, and the routine is exited.

After exiting the routine, the user might invoke other actions, such as panning his screen display to a different portion of the graphic image 1. Upon the second mouse click, the aforementioned check would pass, leaving the decision box on the "YES" line. The second coordinate pair (x2, y2) are stored, and the rectangle is constructed. (The rectangle would be described in either the prior-art case or in the case of the present invention, to --by the coordinate pairs x1,y1;+x2,y1;+x2,y2;+x1,y2;+x-1,y1.) As shown in FIG. 4, the portion of the rectangle contained within the currently displayed portion of graphic image 1 immediately appears on the screen; should the user pan to some other portion of graphic image 1, any portion of rectangle 5 contained in that portion would then be visible.

The invention may be embodied in other specific forms without departing from the spirit thereof. The scope of the invention is embraced by the appended claims rather than the foregoing description of the preferred embodiment.

What is claimed is:

1. In a data processing system including display terminals and having provision for displaying graphic images on the terminals and manipulating the graphic images from the terminals, the terminals being equipped with pointing devices for informing the system of the coordinates within a graphic image of any point therein selected by a user, in which system elements which are to be manipulated are designated by enclosing them within a graphic depiction of a rectangle, and in which a graphic image may be too large or complex for viewing all of it at the terminal simultaneously, a method of specifying a rectangle for designating elements within it as object of manipulation regardless of whether the rectangle can be viewed in its entirety at a given time, the method comprising the steps of:

(a) accepting from the pointing device and storing first image coordinates selected by the user for a first corner of the rectangle;

(b) moving a different portion of the image to the screen display;

(c) accepting from the pointing device and storing second image coordinates selected by the user for a second corner of the rectangle;

(d) constructing in the graphic image the image of the rectangle defined by the first and second image coordinates regarded as being at two diagonally opposite corners.

2. The method recited in claim 1 wherein further:

after accepting from the pointing device the first image coordinates and prior to accepting from the pointing device the second image coordinates, dynamically constructing and including in the image a rectangle defined by the first image coordinates and a position specified by the current position of the pointing device regarded as being at two diagonally opposite corners, whereby the user is able to preview the appearance and position of at least a portion of the rectangle.

* * * * *